United States Patent [19]

Noda et al.

[11] 4,052,563

[45] Oct. 4, 1977

[54] MULTIPLEX SPEECH TRANSMISSION SYSTEM WITH SPEECH ANALYSIS-SYNTHESIS

[75] Inventors: Ken-ichi Noda, Tokyo; Shuzo Saito, Tama, both of Japan

[73] Assignee: Nippon Telegraph and Telephone Public Corporation, Tokyo, Japan

[21] Appl. No.: 620,384

[22] Filed: Oct. 7, 1975

[30] Foreign Application Priority Data

Oct. 16, 1974 Japan .................... 49-119599

[51] Int. Cl.² .................... G10L 1/00; H04J 3/00
[52] U.S. Cl. .................... 179/1 SA; 179/15.55 R; 179/15 A
[58] Field of Search ............. 179/1 SA, 15 R, 15 A, 179/15 AQ, 15.55 R

[56] References Cited

U.S. PATENT DOCUMENTS

| | | | |
|---|---|---|---|
| 3,071,652 | 1/1963 | Schroeder | 179/1 SA |
| 3,624,302 | 11/1971 | Atal | 179/1 SA |
| 3,631,520 | 12/1971 | Atal | 179/1 SA |
| 3,649,765 | 3/1972 | Rabiner | 179/1 SA |
| 3,851,106 | 11/1974 | Jacobaeus | 179/15 AP |
| 3,868,481 | 2/1975 | Patrusky | 179/15 A |
| 3,890,469 | 6/1975 | Kelly | 179/15 AQ |
| 3,909,533 | 9/1975 | Williman | 179/1 SA |

OTHER PUBLICATIONS

Itakura, Saito, "Digital Filtering Teqniques for Speed Analysis and Synthesis", Seventh Inter'l Congress on Acoustics, Budapest, 1971.

Primary Examiner—Kathleen H. Claffy
Assistant Examiner—E. S. Kemeny
Attorney, Agent, or Firm—Charles E. Pfund

[57] ABSTRACT

A plurality of speech channels uses only one speech analyzer-synthesizer by Time-Multiplexing-Demultiplexing (sampling and processing) the speech channels sequentially. On the transmission side, speech signals of a plurality of channels are multiplexed by a pulse code modulation system, a partial autocorrelation coefficient and an excitation signal which constitute a feature parameter of the speech are extracted from the multiplexed signals by means of a speech analyzer for respective digital outputs corresponding to respective speech signals, and the extracted feature parameter is multiplexed again and then transmitted to the receiving side. On the receiving side, the received multiplexed signal of the feature parameter is applied to a speech synthesizer on a time division basis for reproducing a multiplex pulse code modulation signal of the speech wave, and the reproduced signal is distributed among respective channels.

11 Claims, 9 Drawing Figures

| TIME | ——tn | t1 | t2 | t3 | ——— | tn-1 | tn | t1 | t2— |
|---|---|---|---|---|---|---|---|---|---|
| SWITCH 99 | B | A | B | B | ——— | B | B | A | B |
| SWITCH 100 | ——B | A | A | A | ——— | A | B | A | A |
| SWITCH 97 98 101 | n | 1 | 2 | 3 | ——— | n-1 | n | 1 | 2 |

MULTIPLEX SPEECH TRANSMISSION SYSTEM WITH SPEECH ANALYSIS-SYNTHESIS

BACKGROUND OF THE INVENTION

This invention relates to a multiplex speech transmission system, and more particularly to a digital multiplex speech transmission system.

With recent increase in the amount of information to be transmitted, a pulse code modulation system, using digital mulitplex speech transmission systems and capable of efficiently utilizing existing lines have become of interest and commercially used. According to the pulse code modulation system a series of codes is used which are produced by sampling a speech waveform with a frequency of about twice the frequency band width occupied by the speech waveform, and quantizing at a suitable pitch the amplitude of the speech waveform at respective sampling points. With a pulse code modulation system utilized in ordinary speech transmission, speech can be transmitted at high quality by using a sampling frequency of approximately 8 KHz and by quantizing the amplitude to form 7 to 8 bits by adding logarithmic non-linear compressing characteristics. One example of such system is described in a paper of the title "Short Distance 24 Channel PCM System" in Electrical Communication Laboratory Announcing Article, Vol. 12, published Oct. 10, 1965 by Nippon Telegraph & Telephone Public Corporation.

When compared with the conventional analogue speech transmission line of a carrier cable system, the pulse code modulation system described in that paper is advantageous in that it can transmit a large quantity of information because speech signals are transmitted over a single analogue transmission line by using a multiplex system. However, the transmission loss of such system is higher than that of an analogue transmission system so that it is necessary to install regenerative repeaters at a spacing shorter than the length of the analogue transmission line. Accordingly, where such pulse code modulation system is substituted for a conventional analogue speech transmission line, as the length of the transmission line increases the ratio of the cost of the repeaters to the cost of entire installation increases, thus increasing the cost of the pulse code modulation system to be more than that of the analogue speech transmission line. For this reason, at present, the application of the digital multiplex speech transmission system is limited to interoffice trunk lines having relatively short lengths.

Considering the rate of information transmission of the pulse code modulation system described above, as from 56 to 64 kilobits per second are required for each speech channel, researches have been made to have more efficient utilization of the transmission line by decreasing the rate of information transmission. For example, so-called vocoder system has been developed in which correlation characteristics contained in the speech waves are utilized, so as to compress the signal information rate thereby decreasing the rate of information transmission. Such vocoder system is described on pages 720–734 of No. 5, Vol. 54, 1966 of "Proceedings of the I.E.E.E." This system can decrease the rate of information transmission from a fraction to one-tenth of that of the pulse code modulation system described above. With this system, however, a large number of component parts are required for fabricating filters corresponding to digital speech signals, thus increasing the cost of the entire installation. Thus, this system too is not satisfactory for the transmission of information.

BACKGROUND OF THE INVENTION

Accordingly, it is the principal object of this invention to provide an improved and economical multiplex speech transmission system.

Another object of this invention is to provide a novel multiplex speech transmission system suitable for long distance transmission lines.

Still another object of this invention is to provide a novel multiplex speech transmission system that can be readily applied to existing speech transmission networks utilizing pulse code modulation systems without the necessity of modifying the communication networks.

Generally speaking, according to this invention, these and other objects can be accomplished by extracting from a multiplexed digital code speech signal a feature parameter including a partial autocorrelation coefficient and an excitation source signal for each speech channel and by transmitting the signal feature parameter after multiplexing. At the receiving end the signal feature parameter is used to drive a speech synthesizer on a time division basis for decoding the speech and the decoded speech is separated for respective channels.

According to this invention there is provided a multiplex speech transmission system comprising a transmitting apparatus and a receiving apparatus, said transmitting apparatus including means for mulitplexing respective speech signals of a plurality of speech channels constituting one group by subjecting said speech signals to pulse code modulation, means for extracting a feature parameter including a partial autocorrelation coefficient and an excitation source signal of each speech channel in accordance with the multiplexed digital code speech signal, means for further multiplexing the extracted feature parameter with the feature parameter of the other group, and means for transmitting the further mutliplexed feature parameter signal over a transmission line; and said receiving apparatus including means for separating the further multiplexed feature parameter signal received into respective groups, means responsive to the separated feature parameter signal for restoring the speech signal that has been mulitplexed by time division control and means for distributing the restored signal among respective speech channels thereby producing speech signals in respective speech channels.

DESCRIPTION OF THE PREFERRED EMBODIMENTS

Figure 1:
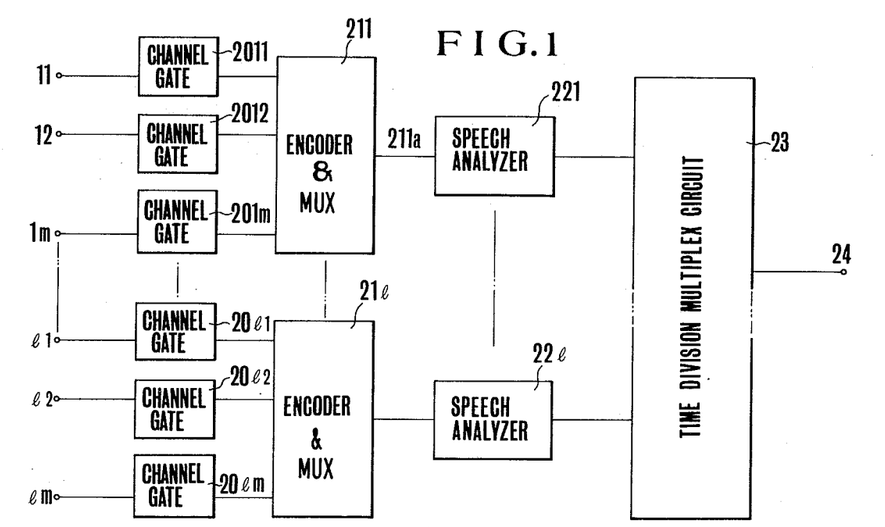
FIG. 1 is a block diagram illustrating the apparatus on the transmitting end of the novel multiplex speech transmission system embodying the invention.
Figure 2:
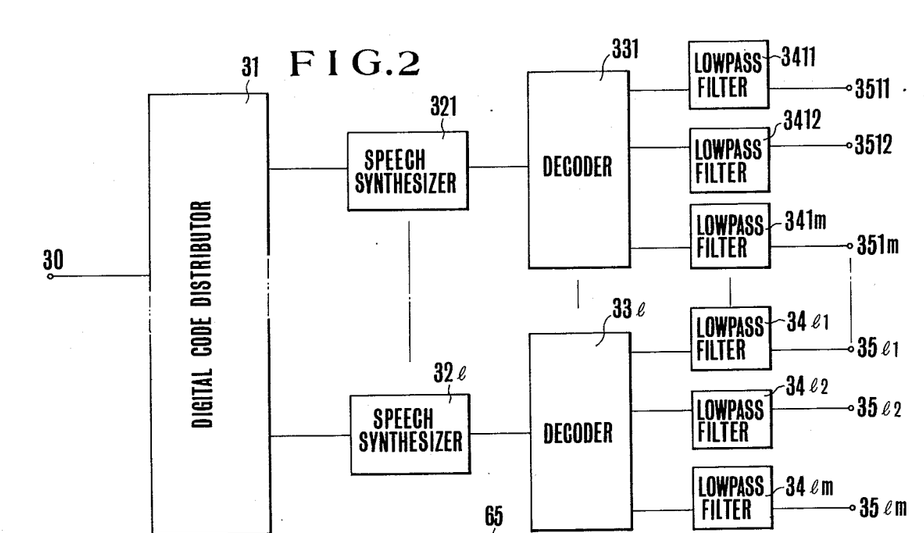
FIG. 2 is a block diagram showing the apparatus on the receiving end of the tranmission system shown in FIG. 1.

FIGS. 1 and 2 show one embodiment of the novel multiplex speech transmission system of this invention. The apparatus on the transmitting end is shown in FIG. 1 and that on the receiving end is shown in FIG. 2. The system shown in FIGS. 1 and 2 includes $l \times m$ channels which are divided into $l$ groups each constituted by $m$ speech input terminals. The first group comprises speech input terminals $1l$ through $1m$ respectively connected to channel gates $201l$ through $201m$ which function to repeatedly sample the speech applied to respective speech input terminals $1l$ through $1m$ with a predetermined timing thereby producing time divisioned pulse amplitude modulation signals.

The outputs from these channel gates $201l$ through $201m$ are sent to a common encoder 211 where respective channel gate amplitudes comprising the outputs from respective channel gates are non-linearly encoded into signals each containing 7 or 8 bits and the output of the encoder 211 is sent to the output line $211a$ as multiplex pulse code modulation signals. The apparatus thus far described has been used in a commercial pulse code modulation system. For example, such circuit is described in a paper of the title "Short Distance 24 Channel PCM System" in Electrical Communication Laboratory Announcing Article, Vol. 12, published on Oct. 10, 1965 by Nippon Telegraph & Telephone Public Corporation. The pulse code modulation signals sent to the output line $211a$ from encoder 211 are sent to a speech analyzer 221 where they are converted into feature parameters including an excitation source signal and a partial autocorrelation coefficient for respective speech channels. The construction of the speech analyzer will be described later with reference to FIGS. 3 and 4.

Similar signal processing systems are provided for the channels of the other groups. In FIG. 1, is shown the signal processing system for the speech channels $l_1$ through $lm$ of group $l$ as an example of such signal processing systems for the channels of the other groups. In FIG. 1 the channel gates for input terminals $l_1$ through $lm$ are designated by $20l_1$ through $20lm$, the encoder by $21l$ and the speech analyzer by $22l$. Also the speech analyzer $22l$ produces multiplex signals converted into feature parameters for respective speech channels of the $l$th group. In other words, speech signals in a plurality of channels are converted into mulitplex signals having a common feature parameter for respective groups of $m$ channels.

In this manner, digital signals with multiplex feature parameters produced by speech analyzers $22l$ through $22l$ are supplied to a time division multiplex circuit 23 which further multiplexes the multiplexed signals from respective speech analyzers. Such multiplexing action is performed by the same code capacity as that of the multiplex code modulation outputs from said existing encoders $21l$ and $21l$. As a consequence, the multiplex digital outputs supplied to output terminal 24 from the time division multiplex circuit 23 are sent to a conventional transmission line, not shown, for the multiplex encoded speech signals for $m$ channels. The multiplex encoded speech signals transmitted over the transmission line are converted into speech signals for respective channels by the apparatus on the receiving end shown in FIG. 2.

The multiplex encoded speech signals received by the apparatus shown in FIG. 2 are sent to a digital code distributor 31 through a multiplex digital input terminal 30 where the signals are divided into $l$ time division multiplex signals which are sent to speech synthesizers $32l$ through $32l$. In FIG. 2, the speech synthesizers other than speech synthesizer 321 are represented by $32l$. However, it should be understood that $l$ speech synthesizers are actually used. The construction of the speech synthesizer will be described later with reference to FIGS. 5 and 6. The speech synthesizer 321, for example, functions to convert the time division signal of $m$ channels of the first group into multiplex pulse code modulation signals having the waveform of the speech. Such pulse code modulation signals are then sent to decoders 331 through $33l$ to be converted and separated into $m$ pulse amplitude modulation signals for respective channels. The outputs from decoders 331 through $33l$ are passed through low pass filters $3411$-$341m$ and $34l1$-$34lm$ respectively to restore respective analogue speech waveforms for respective channels which are sent to speech output terminals $3511$-$351m$ and $35l1$-$35lm$ respectively.

The contruction described above has the following advantages.

1. With this construction since the time division multiplex signals obtained by using a pulse conde modulation system are processed by a speech analyzer to derive therefrom a feature parameter including a partial autocorrelation coefficient and an excitation source signal, the information rate is compressed to about one-tenth of the information rate of the conventional pulse code modulation multiplex transmission system. Moreover, the construction of the system is simpler than that of the conventional vocoder system. As a result, it is possible to decrease the cost of installation of the conventional pulse code modulation transmission system as compared with the analogue tranmission system over a long distance by decreasing the rate of information transmisson of the speech signals of respective channels, thereby increasing the number of channels that can be transmitted on the multiplex basis over one tranmission line. Accordingly, it is possible to obtain a digital multiplex speech transmission system of lower cost of installation than in an analogue transmission line even when a larger number of regenerative repeaters are used for a long distance transmission line.

2. The multiplex speech transmission system of this invention can readily be applied to an existing pulse code modulation transmission system by merely adding thereto a speech analyzer and a speech synthesizer.

3. Furthermore, as the rate of information transmission of the speech signals or respective channels can be reduced, it is possible to increase the number of channels capable of effecting multiplex transmission over one transmission line by multiplexing the outputs of respective speech analyzer as above described.

Figure 3:
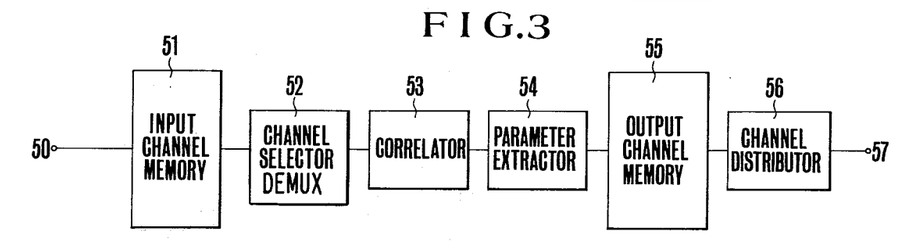
FIG. 3 is a block diagram showing one example of the speech analyzer utilized in the system shown in FIG. 1.

The construction of each speech analyzer 221 through $22l$ shown in FIG. 1 will now be described with reference to FIGS. 3 and 4. Each speech analyzer such as shown in FIG. 3 comprises an input terminal 50 which is connected to receive the respective pulse code modulation signals from the encoders 211 through 21*l* shown in FIG. 1. These signals contain speech signals of a time interval sufficient to derive therefrom the feature parameters of the speech and such speech signals are sequentially stored in an input channel memory device 51. Usually the time interval has a length of 20 to 30 milliseconds. Accordingly, when the signal is sampled at a frequency of 8 KHz, the number of data samples obtainable during this interval amounts to from 160 to 240. Thus, the input channel memory device 51 will store such data for each speech signal. In this example, since multiplexing of $m$ channels is contemplated the input channel memory device 51 is required to have a minimum capacity of from $160m$ to $240m$ bits.

The data which have been stored in the input channel memory 51 is divided for respective speech channels by a channel selector 52 and the divided data are sent to a correlator 53 which is cascade connected with a parameter extractor 54 which extracts the partial autocorrelation coefficient signal and the excitation source signal constituting the feature parameter of the speech. Extraction of the partial autocorrelation coefficient signal may be done according to the definition regarding the partial autocorrelation coefficient described in the specification of applicants Japanese patent application No. 40632/1969 (Japanese patent publication No. 18007/1974, dated May 7, 1974) of the title "Speech Analysis/Synthesis Telephony System". Briefly stated, by denoting the time series of a portion of a discrete sampled value of a speech waveform by $\{X_0, X_1, X_2 \ldots X_{n-1}, X_n\}$, by predicting the sampled value $X_0$ and $X_n$ at the opposite ends by the minimum squared error estimation from the time seris $\{X_1, X_2 \ldots X_{n-1}\}$ between the opposite ends and by denoting the predicted values by $\hat{X}_0$ and $\hat{X}_n$, respectively, the partial autocorrelation coefficient $k_n$ can be expressed by the following equation $$k_n = \frac{E\{(X_o-\hat{X}_o)(X_n-\hat{X}_n)\}}{[E\{(X_o-\hat{X}_o)^2\} \cdot E\{(X_n-\hat{X}_n)^2\}]^{\frac{1}{2}}} \quad (1)$$

The denominator of equation (1) is a square root of the product of the expectation values of the squares of the difference between the actual or sampled values and the estimated values respectively for $X_0$ and $X_n$, whereas the numerator shows the expectation value of the product of respective differences, that is, the covariance. Expressing $\hat{X}_0$ and $\hat{X}_n$ by using linear expection coefficients $\alpha^{(n-1)}$ and $\beta^{(n-1)}$ we obtain $$X_n = \sum_{i=1}^{n-1} \alpha_i^{(n-1)} X_{n-i}$$

$$X_o = \sum_{i=1}^{n-1} \beta_i^{(n-1)} X_{n-i}$$

Under the minimum squared error condition, $$E\{(X_o-\hat{X}_o)(X_n-\hat{X}_n)\} = \sum_{i=0}^{n-1} \alpha_i^{(n-1)} V_{n-i} \quad (2)$$

$$E\{(X_o-\hat{X}_o)^2\} = E\{(X_n-\hat{X}_n)^2\} = \sum_{i=0}^{n-1} \alpha_i^{(n-1)} V_i \quad (3)$$

$$(4)$$

-continued
$$\alpha_i^{(n)} = \alpha_i^{(n-1)} - k_n \beta_i^{(n-1)}$$

$$\beta_i^{(n-1)} = \alpha_{n-i}^{(n-1)} \quad (5)$$

where $V$ represents the covariance function of the sampled value. It has been proved experimentally that the partial autocorrelation coefficient $k_n$ represents the correlation characteristics at an adjacent point in the speech waveform if one selects the value of $n$ in a range of 1 to 10 in a speech signal. The values of $k_n$ are recurrently determined up to a maximum value $n = 10$ by using initial values of $n = 1$ and $\alpha_0^{(1)} = 1$ in equations (1) through (5). At this time, the value of $\alpha_i^{(n)}$ is also determined, and the value thus determined is used to determine the sound source signal or so-called pitch by the method disclosed in the specification of the applicants prior Japanese patent application No. 64704/1967 (Japanese patent publication No. 15402/1972, dated May 9, 1972) of the title "Speech Analizing and Synthesizing Apparatus". The sound source signal obtained contains an amplitude ratio control signal, amplitude signals control signal, etc. which control pulse synchronization and the amplitude ratio between the pulse generator output and the noise generator output. In this manner, the partial autocorrelation coefficient and the excitation source signal are derived from the parameter extractor 54. The output from the parameter extractor 54 is stored in an output channel memory device 55 for respective speech signals in $m$ channels and at each frame period of the feature parameter. In an ordinary speech signal the frame period has a length of 10 milliseconds. The feature parameters corresponding to the speech signals in $m$ channels which have been stored in the output channel memory device 55 are multiplexed by a channel distributor 56 and then sent out to the time division multiplex circuit 23 shown in FIG. 1 via output terminal 57. By extracting the partial autocorrelation coefficient and the excitation signal by the method described above it is possible to construct the speech analyzer with a simple circuit arrangement which is used to perform digital processing. Moreover, as the feature extracting method is used, it is possible to reduce the rate of information transmission to about one-tenth of that of the conventional pulse code modulation system.

Figure 4:
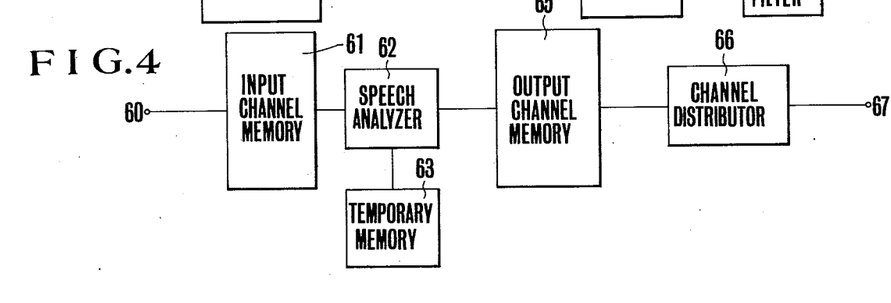
FIG. 4 is a block diagram showing another example of the speech analyzer utilized in the system shown in FIG. 1.

FIG. 4 is a block diagram showing a speech analyzer of the type different from that shown in FIG. 3. In the circuit shown in FIG. 4, the pulse code modulated speech inputs of $m$ channels applied to an input terminal 60 from encoders 211 and 21*l* are fed to an input channel memory device 61 in every frame unit. In the modification, since the memory capacity of the input channel memory device 61 is equal to only one frame capacity, in other words equal to a memory capacity enough to store only one sample information of $m$ channels, the memory capacity of the input channel memory device 61 is much smaller than that of the input channel memory device 51 shown in FIG. 3.

The input channel memory device 61 supplies to a speech analyzer 62 the data of respective samples of respective speech signal of $m$ channels. The speech analyzer 62 extracts the partial autocorrelation coefficient and the excitation source signal for the data regarding respective samples by the same operation as that disclosed in said Japanese patent application No.

40632/1969 (Japanese patent publication No. 18007/1974). However, since the input to the speech analyzer 62 comprises the multiplexed signals of $m$ channels it is necessary to perform multiplex analysis of respective speech signals of $m$ channels. In other words, in the speech analyzer 62 it is necessary to repeat several times the analysis operation for averaging the analyzed data. For this reason, the analyzed data are stored in a temporary memory device 63 for each sampled data of the speech signal and for each channel. The speech analyzer 62 is constructed such that each time a sampled value is received, the analyzed data of a given channel that have been analyzed until that time are supplied to various portions of the speech analyzer from the temporary memory device 63 to be analyzed. In this manner, multiplex analysis is performed thus analyzing and extracting the feature parameters.

The feature parameters analyzed in this manner are written into an output channel memory device for each 10 milliseconds, that is, one frame period, and the channel distributor 66 sends the $m$ channel multiplex feature parameters from the output channel memory 65 to time division multiplex circuit 23 through output terminal 67.

According to the circuit construction shown in FIG. 4, since the temporary memory device 63 stores the analyzed value, the number of informations may be smaller than the case when it stores the sampled value. Moreover, as the data are written in the input channel memory unit 61 as a frame unit as has been described above, the capacity of the memory device required to store the data of $m$ channels which have been sampled at a sampling frequency of 8 KHz, for example, may be smaller than the circuit shown in FIG. 3.

Figures 5, 6:
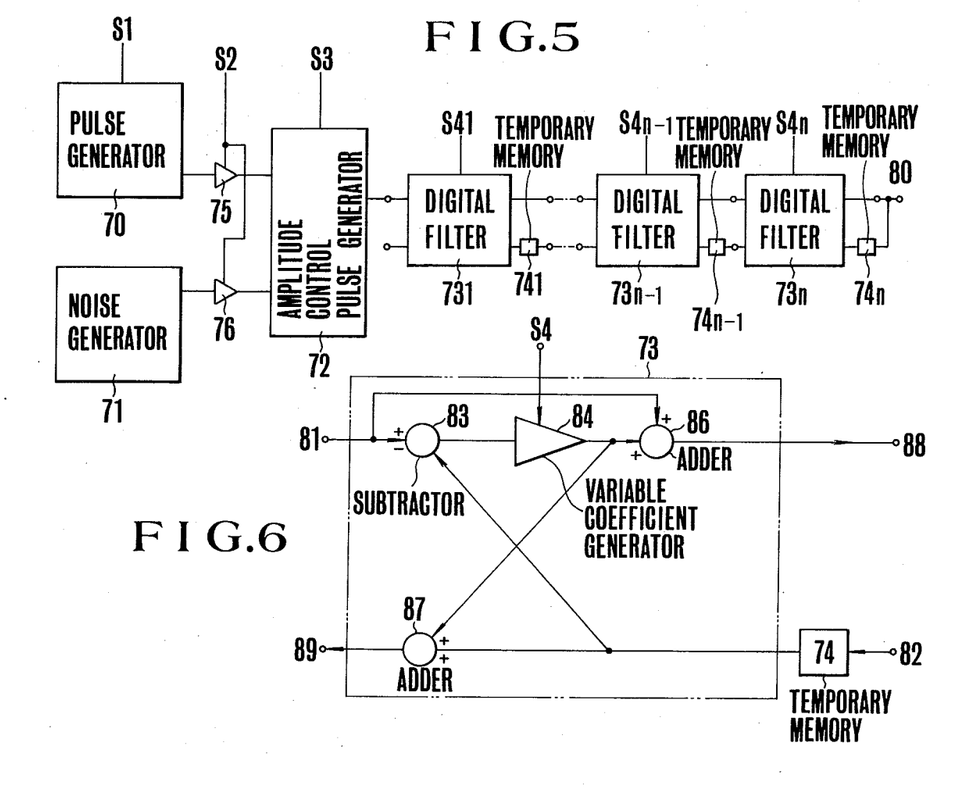
FIG. 5 is a block diagram showing one example of a speech synthesizer utilized in the circuit shown in FIG. 2.
FIG. 6 is a connection diagram showing the digital filter section and the temporary memory device shown in FIG. 5.

The detail of the speech synthesizer shown in FIG. 2 will now be described with reference to FIGS. 5 through 9 of which FIGS. 5 and 6 show the basic construction of the speech synthesizer. The circuit shown in FIG. 5 comprises a pulse generator 70, a noise generator 71, an amplitude control device 72, digital filters 731 through 73n, and temporary memory devices 741 through 74n, multipliers 75 and 76 for controlling the amplitude ratio, which are connected to be controlled by control signals $S_1$, $S_2$, $S_3$, $S_{41}$, through $S_{4n}$, respectively. The control signal $S_1$ is used to control the period of the output pulse train from the pulse generator 70 which corresponds to the control of the fundamental frequency of the synthesized speech whereas the control signal $S_2$ controls the output amplitude ratio between the pulse generator 70 and the noise generator 71. The control signal $S_3$ controls the output amplitudes of both pulse generator 70 and the noise generator 71 and these control signals are produced by the excitation source signal of the feature parameter. Control signals $S_{41}$ through $S_{4n}$ control $n$ digital filters 731 through 73n, this corresponding to the control of the envelope of the frequency spectrum of the synthesized speech. Usually from six to 10 control signals are used. Control signals $S_{41}$ through $S_{4n}$ are produced by the partial autocorrelation coefficient.

FIG. 6 is a diagram utilized to explain the operation of digital filters 731 through 73n and temporary memory devices 741 through 74n. The circuit shown in FIG. 6 comprises an input terminal 81, a feedback signal input terminal 82, a subtractor 83 a variable coefficient generator or multiplier 84, adders 86 and 87 and output terminals 88 and 89. When signals are applied to the input terminal 81 and the feedback signal input terminal 82, the output from the temporary memory device 74 which temporarily stores the feedback signal is subtracted from the input signal supplied to the input terminal 82 by subtractor 83, and the output from the subtractor 83 is multiplied by a coefficient generated by the variable coefficient generator 84. The output from the variable coefficient generator 84 is added to the input signal applied to the input terminal 81 by adder 86, and further added to the output from the temporary memory device 74 by adder 87. The outputs from these adders are applied to the output terminals 88 and 89. The temporary memory device 74 functions to delay the signal fed back to a preceding digital signal by a unit time, for example 1/8000 second, when a sampling frequency of 8 KHz is used. As can be noted from the foregoing description, each one of the digital filters performs two additions, one subtraction and one multiplying operations in each unit time. When these operations are performed by a well known high speed digital operation circuit it is possible to complete the operations in a time extremely shorter than the unit time. Moreover, as respective digital filters have the same construction, such digital operation circuits can satisfactorily perform the time division multiplexing operation.

By controlling the pulse generator 70, the noise generator 71, the amplitude control pulse generator 72 and the multipliers 75 and 76 for controlling the amplitude ratio by the control signals $S_1$ through $S_3$ as shown in FIG. 5, a sound source pulse signal and a white noise signal are formed. These signals are applied to a $n$ stage cascade connected circuit constituted by $n$ digital filters 731 through 73n respectively controlled by the control signals $S_{41}$ through $S_{4n}$ and temporary memory devices 741 through 74n to produce a pulse amplitude modulated speech signal on the output terminal 80. More particularly, when the control signals $S_1$, $S_2$ and $S_3$ are applied to the pulse generator 71, the amplitude control pulse generator 72 and the amplitude ratio multipliers 75 and 76, a sound source pulse signal having the same period as the excitation source signal will be generated. This signal and the white noise signal are applied to multi-stage digital filters 731 through 73n whereby the parameters of the filters of the respective stages are controlled by the control signals $S_{41}$ through $S_{4n}$ or the partial autocorrelation coefficients thus correlating the parameters and said signals. Such operations are performed whenever a feature parameter is applied and the digital values of the speech synthesizer at that time are stored in the temporary memory devices 741 through 74n. During the succeeding synthesizing operation the signals of respective digital filters of the speech synthesizer are reapplied to the same from the temporary memory devices 741 through 74n so as to control respective digital filters 731 through 73n of the speech synthesizer with the feature parameter thus obtaining a synthesized output.

Multiplex pulse amplitude modulated signals can be reproduced by using the speech synthesizer operating as above described.

Figure 7:
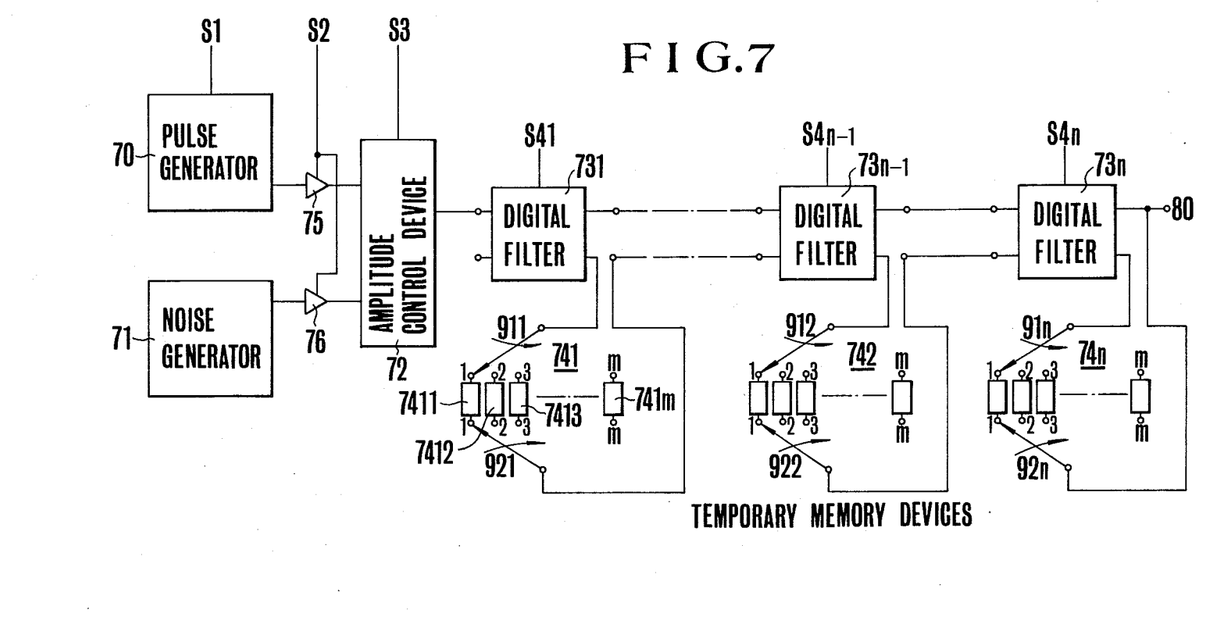
FIG. 7 is a block diagram showing one example of a parallel type time division multiplex synthesizing apparatus utilizing the principle of the speech synthesizer shown in FIGS. 5 and 6.

FIG. 7 illustrates one example of a parallel time division multiplex speech synthesizing apparatus embodying the invention and utilizing the speech synthesizer which has already been described with reference to FIGS. 5 and 6. In this case, control signals $S_1$, $S_2$, $S_3$, $S_{41}$-$S_{4n}$ are produced by the time division multiplex signals of $m$ channels sent from the digital code distributor 31 shown in FIG. 2, the contents of the control signals have already been described. Pulse generator 70, noise generator 71, amplitude control device 72 and digital filters 731 through 73n have the same construction and function as those shown in FIG. 4. However, temporary memory devices 741 through 74n are different from those shown in FIG. 5. Thus, respective temporary memory devices are connected between digital filters 731 through 73n through respective transfer switches 911 through 91n and 921 through 92n, and each temporary memory device is constituted by a plurality of memory units of the same number as the multiplex channnels for the time division signals supplied by the digital code distributor 31. For example, with regard to the temporary memory device 741, it comprises $m$ temporary memory units 7411 through 741m of the same number as the $m$ channels for the time division signal. One terminal of these temporary memory units 7411 through 741m is selectively connected to digital filter 731 via transfer switch 911 and the opposite terminal to digital filter 732, not shown, via transfer switch 921. The transfer switches 911 and 921 are operated in synchronism with the channel timing of the first through $m$th channels that constitute one frame of the time division multiplex signal, so as to sequentially connect temporary memory units 7411 through 741m between adjacent digital filters 731 and 732. In this specification, a term "one frame" means the period of renewal of control signal.

Upon receiving a time division multiplex signal from the digital code distributor 31, transfer switches 911 through 91n and 921 through 92n are operated for an interval corresponding to one frame of the time division multiplex signal so as to sequentially connect the temporary memory units between adjacent digital filters in synchronism with the channel timing of the time division multiplex signal whereby to process the signal for producing a pulse amplitude modulation signal having a multiplexed speech waveform. The contents of respective temporary memory units are renewed at the end of each one frame period. After being converted into a pulse code modulation signal the pulse amplitude modulation signal is sent to a low pass filter through a decoder, not shown, to reproduce an analogue speech waveform for each channel.

Figure 8:
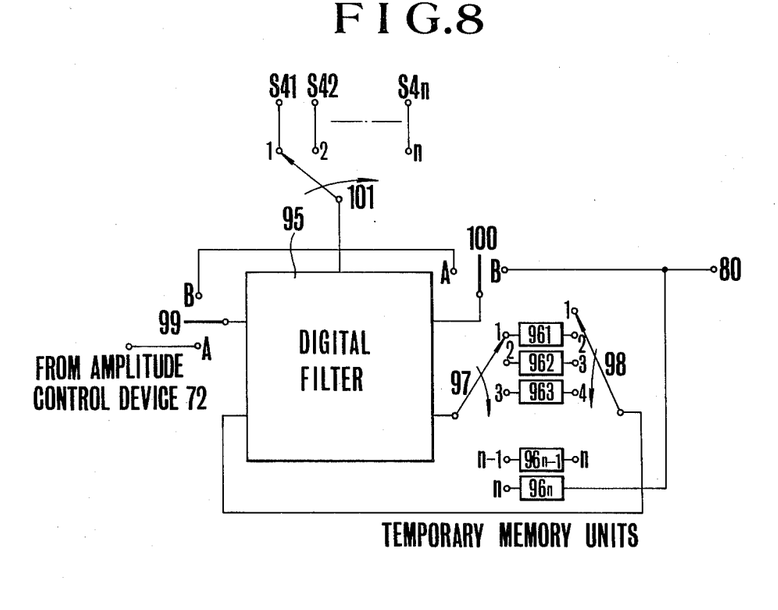
FIG. 8 is a block diagram showing one example of a series type time division multiplex speech synthesizing apparatus and FIG. 9 is a diagram to explain the operation of various switches shown in FIG. 8.

FIG. 8 illustrates a series type time division multiplex speech synthesizing apparatus wherein a single digital filter 95 is used at a plurality of time for processing the signal in $n$ stages. The digital filter 95 has the same construction as those shown in FIGS. 5 and 7. In other words, the digital filter 95 has the same construction as that shown in FIG. 6. There are also provided temporary memory units 961 through 96n which correspond to the temporary memory units 741 through 74n provided for digital filters of respective stages, and transfer switches 97 and 98 for sequentially connecting terminals $l$ to $n$ of the temporary memory units 961 through 96n to digital filter 95 in accordance with the channel timing of the multiplex time division signal sent from the digital code distributor 31. The stationary contacts of the transfer switches 97 and 98 are displaced one step in the vertical direction. Thus, the first stationary contact of the switch 97 is connected to one end of the temporary memory unit 961 whereas the first stationary contact of the switch 98 is idle. The $n$th stationary contact of switch 97 is connected to one end of the temporary memory unit 96n while the other end thereof is connected to the output terminal 80. The $n$th stationary contact of the transfer switch 98 is connected to one end of the temporary memory unit $96_{n-1}$. On both sides of the digital filter 95 are provided input and output transfer switches 99 and 100.

Figure 9:
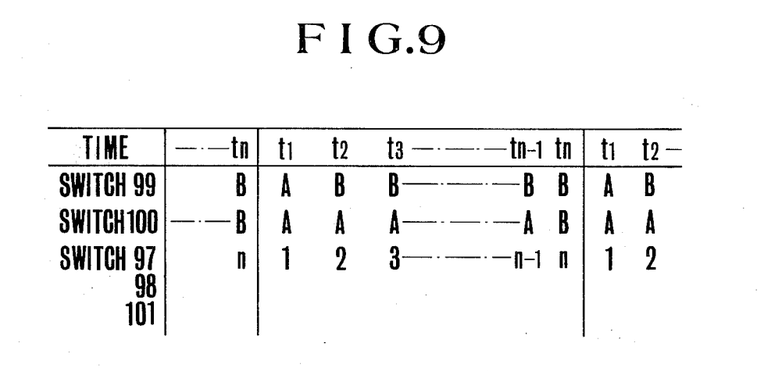

FIG. 9 shows the timing of the operation of respective switches 97 to 101 per one frame of the multiplex time division signal. As shown in FIG. 9, switch 99 is thrown to A side at a time $t_1$ alone of a series of the sampling times $t_1, t_2 \ldots t_n$ which constitute one period and thereafter ($t_2$ to $t_n$) to B side whereas switch 100 is thrown to A side at times of from $t_1$ to $t_{n-1}$ and to B side at a time $t_n$ alone. Switch 101 is operated in synchronism with switches 97 and 98 as shown in FIG. 9. Since the operation of the circuit shown in FIG. 8 is similar to that of the circuit shown in FIGS. 5 and 7 except the operations of the transfer switches, it is believed unnecessary to describe it again.

Where the pulses are encoded on the transmitting side by utilizing compression characteristics the pulse amplitude modulated signals demodulated on the receiving side can be expanded by a common expander. Where the receiving system of an existing pulse code modulation system is utilized the output of a speech synthesizer may be subjected to pulse code demodulation and then supplied to an existing pulse code demodulator.

It should be understood that the invention is not limited to the specific embodiments illustrated and that many changes and modifications will be obvious to one skilled in the art without departing from the true scope and spirit of the invention as defined in the appended claims.

What is claimed is:

1. A multiplex speech transmission system comprising a transmitting apparatus and a receiving apparatus, said transmitting apparatus including means for multiplexing respective speech signals of a plurality of speech channels constituting at least two groups thereof by subjecting said speech signals to pulse code modulation, speech analyzing means for extracting a feature parameter signal including a partial autocorrelation coefficient and an excitation source signal from each of said multiplexed pulse code modulation speech signals, time division multiplexing means for further multiplexing said extracted feature parameters from the signals of one of said groups with the feature parameters from the signal of at least one other of said groups, and means for transmitting said further multiplexed feature parameter signals over a transmission line; and said receiving apparatus including means for separating said received further mutliplexed feature parameter signals into said at least two respective groups, means responsive to said separated feature parameter signals for restoring the speech signals that have been multiplexed by time division control and means for distributing the restored signals among respective speech channels thereby producing speech signals in respective speech channels.

2. The multiplex speech transmission system according to claim 1 wherein said means for multiplexing respective speech signals of said plurality of speech channels by pulse code modulation comprises a plurality of channel gates for sampling the speech signals in respective speech channels to produce pulse amplitude modulation signals and an encoder responsive to the outputs of a plurality of channel gates constituting each of said groups for digitizing respective sampled pulse amplitudes thereby producing multiplexed pulse code modulation signals.

3. The multiplex speech transmission system according to claim 2 wherein said speech analyzing means provided at said transmitting apparatus comprises a speech analyzer for extracting the partial autocorrelation coefficient and the excitation source signal of each speech channel in accordance with the multiplexed pulse code modulation signals produced by said encoder.

4. The multiplex speech transmission system according to claim 1 wherein said means provided at said receiving apparatus for separating the received further multiplexed signals comprises a digital code distributor for converting said received signal into a plurality of time division multiplexed signals comprising said at least two respective groups.

5. The multiplex speech transmission system according to claim 1 wherein said means provided at said receiving apparatus for restoring the multiplexed signals comprises a speech synthesizer which converts the time division signals of a plurality of channel constituting each said group into pulse code modulation signals having multiplexed speech waveforms.

6. The multiplex speech transmission system according to claim 1 wherein said means provided at said receiving apparatus for distributing the restored speech signals among respective speech channels comprises a decoder for converting said pulse code modulation signals into pulse amplitude modulation signals corresponding to respective speech channels and low pass filters for converting respective amplitude modulation signals into signals having analogue speech waveforms.

7. The multiplex speech transmission system according to claim 3 wherein said speech analyzer of each said group comprises an input channel memory device for storing multiplexed pulse code modulation signals for an interval necessary for extracting a feature parameter of the speech signals of each channel, a channel selector for selecting a channel which derives a signal from said input channel memory device, correlator means receiving the output from said channel selector, a feature parameter extractor for deriving a feature parameter from the output from said correlator means, and output channel memory means for storing the output from said feature parameter extractor for respective channels and for producing multiplexed outputs for each of said respective channels.

8. The multiplex speech transmission system according to claim 3 wherein said speech analyzer of each said group comprises an input channel memory device for storing multiplexed pulse code modulation signals of respective channels of each frame, a temporary memory device, a speech analyzer for analyzing the combination of the pulse code modulation signals from said input channel memory device and the output from said temporary memory which has been storing the analyzed data from preceding pulse code modulation signals, and output channel memory means for storing the output from said speech analyzer.

9. The mutliplex speech transmission system according to claim 5 wherein each said speech synthesizer comprises a pulse generator, a noise generator, a multiplier for controlling the amplitude ratio fo the outputs of said pulse generator and said noise generator, means for controlling said pulse generator, said noise generator and said multiplier in accordance with control signals comprising the excitation source signal of the feature parameter signals transmitted over said transmission line, said speech synthesizer thereby providing a composite signal comprising a source pulse signal and a white noise signal, a plurality of cascade connected digital filters, the number thereof corresponding to the number of the control signals of the partial autocorrelation coefficient, a plurality of temporary memory devices, of the same number as that of the channels that comprise the multiplexed signals for temporarily storing the outputs from respective digital filters, and switch means for connecting said temporary memory devices to said digital filters in synchronism with the channel timing of the mutliplexed signals thereby correlating said composite signal with the control signals of said partial autocorrelation coefficient supplied to respective digital filters.

10. The multiplex speech transmission system according to claim 5 wherein each said speech synthesizer comprises a pulse generator, a noise generator, a multiplier for controlling the amplitude ratio of the outputs of said pulse generator and said noise generator, an amplitude control device, means for controlling said pulse generator, said noise generator and said multiplier in accordance with control signals comprising the excitation source signal of a feature parameter transmitted over said transmission line, said speech synthesizer thereby providing a composite signal comprising a pulse signal and a white noise signal, a digital filter, a plurality of temporary memory devices, the number thereof corresponding to the number of control signals comprising the partial autocorrelation coefficient of the feature parameter, switch means for connecting a temporary memory device to the digital filter in response to a control of the partial autocorrelation coefficient supplied to the digital filter, and a transfer switch responsive to the control signal of the partial autocorrelation coefficient supplied to the digital filter for switching the input and the output to said digital filter thereby correlating said composite signal and the control signal of the partial autocorrelation coefficient supplied to respective digital filters.

11. A multiplex speech transmission system comprising transmitting apparatus and receiving apparatus, said transmitting apparatus including a plurality of speech channels which are divided into a plurality of groups, said speech channels of respective groups each having a plurality of channel gates connected to sample speech signals of said respective channels for forming pulse amplitude modulation signals, means for encoding and multiplexing the pulse amplitudes of the pulse amplitude modulation signal outputs from said plurality of channel gates to provide a plurality of pulse code modulation signals, signal analyzer means for extracting feature parameters from the pulse code modulation signals of said respective speech channels, each one of said feature parameters comprising a partial autocorrelation coefficient and an excitation source signal, and a time division multiplexing circuit for time multiplexing the outputs of respective speech analyzers of respective groups and for transmitting the multiplexed outputs over a transmission line, and said receiving apparatus including a digital code distributor for separating the transmitted outputs of said time division multiplexing circuit sent over said transmission line into time division multiplex signals of respective groups, a plurality of speech synthesizers responsive to the time division multiplex signals of respective groups from said digital code distributor for converting said time division multiplex signals into multiplexed pulse code modulation signals, a plurality of decoders responsive to the outputs from respective speech synthesizers for converting said outputs into pulse a amplitude modulation signals corresponding to respective speech channels, and a plurality of low pass filters supplied with the outputs of respective decoders corresponding to respective speech channels.

* * * * *

UNITED STATES PATENT AND TRADEMARK OFFICE
CERTIFICATE OF CORRECTION

PATENT NO. : 4,052,563
DATED : October 4, 1977
INVENTOR(S) : Ken-ichi Noda and Shuzo Saito It is certified that error appears in the above-identified patent and that said Letters Patent are hereby corrected as shown below:

Col. 1, line 11, change "mulitplex" to ---multiplex---.

Col. 3, last line, change "21$l$" (first occurrence), to ---211---.

Col. 4, lines 46 and 50, change "tranmission" to ---transmission---.

Col. 4, line 61, change "or" to ---of---.

Col. 5, line 35, change "seris" to ---series---.

Col. 5, lines 63 and 67 (Equations 2 and 3), "l=0" should be ---i=0---.

Col. 6, line 25, delete "signals" after "amplitude"; insert "signals" after ---which---.

UNITED STATES PATENT AND TRADEMARK OFFICE
CERTIFICATE OF CORRECTION

PATENT NO. : 4,052,563
DATED : October 4, 1977
INVENTOR(S) : Ken-ichi Noda and Shuzo Saito It is certified that error appears in the above-identified patent and that said Letters Patent are hereby corrected as shown below:

Claim 9, Col. 11, line 57, change "fo" to ---of---.

Signed and Sealed this

Fifth Day of December 1978

[SEAL]

Attest:

RUTH C. MASON
Attesting Officer

DONALD W. BANNER
Commissioner of Patents and Trademarks